United States Patent Office 2,788,964
Patented Apr. 16, 1957

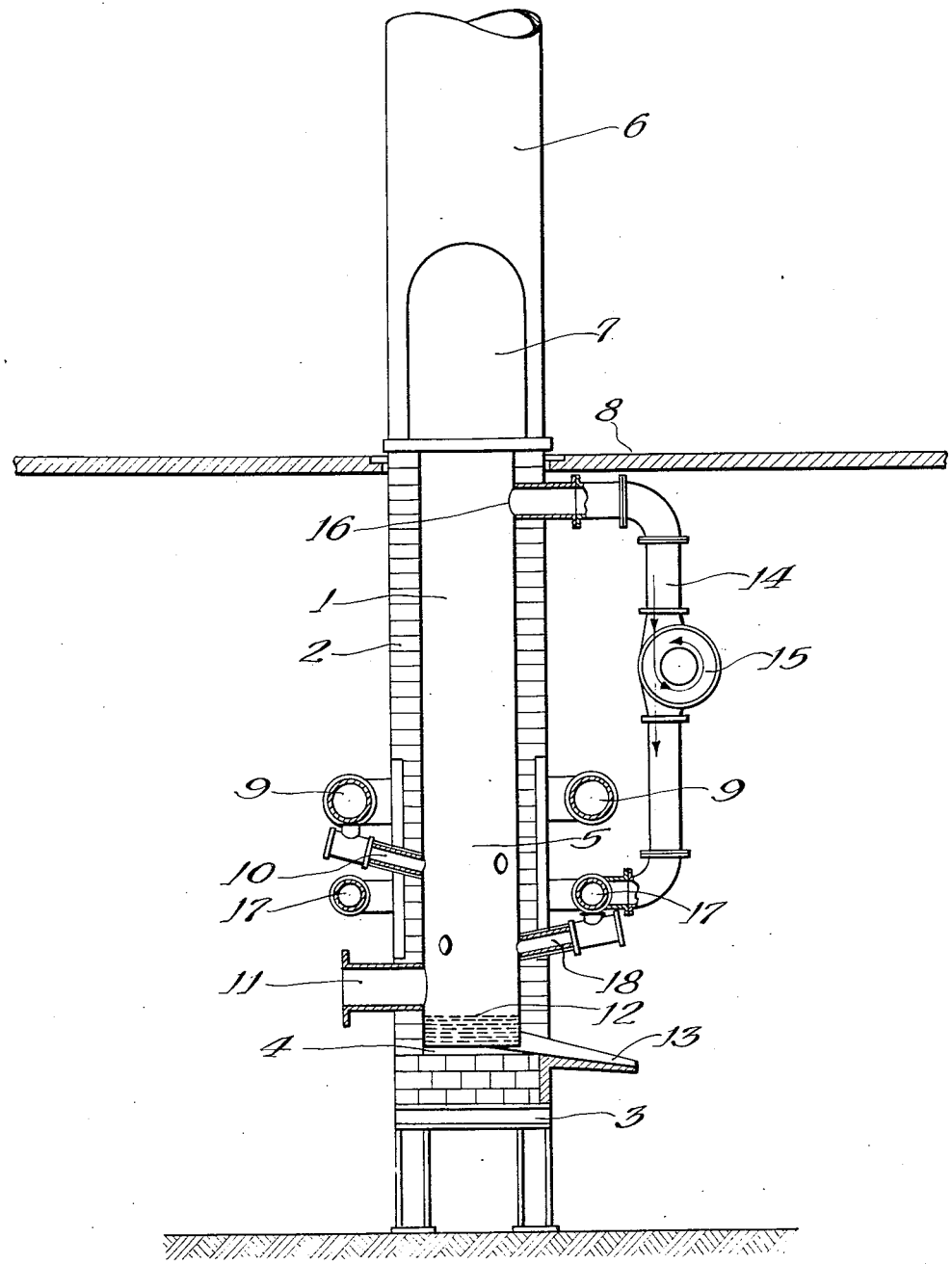

2,788,964

METALLURGICAL FURNACE

Otto Schnyder, Lausanne, Switzerland

Application April 12, 1954, Serial No. 422,608

3 Claims. (Cl. 266—25)

This invention relates in general to shaft furnaces and more particularly to hot-blast shaft furnaces and a method for operating such furnaces in the smelting or reduction of metal ores.

The use of shaft furnaces for smelting and reduction purposes has long been customary for foundry and smelting work. There are two main types of furnace which are mostly used for this work.

One of these is the blast furnace used in smelting works for the reduction of iron ore in large quantities. The idea of building blast furnaces for smaller installations and therefore for smaller outputs has repeatedly been examined. The blast furnace, however, is not suitable for such small installations, as the installation requires an extensive auxiliary plant in addition to the blast furnace and necessitates the use of coarse-grained coke and ore in order to allow the gases to be led upwards through the column formed by the charge and thus to enable the indirect reduction to be obtained. The auxiliary plant must therefore necessarily include a coking plant.

In many cases, however, a large plant is not necessary, particularly in countries which are not fully developed economically, and where for instance, a production of about 10,000 tons of pig iron a year is needed, use having to be made of ore and fuel locally available. On the other hand, the need is often felt, even in the case of large smelting works, to compensate a loss in output of the blast furnaces due to a shortage of scrap, by means of a small installation.

To reduce the size of a blast furnace in order to obtain the desired smaller output is, however, not possible on technical grounds, and would in any case not be economical on account of the auxiliary plant required.

The second type of furnace which is often employed is the cupola, such as used in foundries. The idea of using the cupola, which gives excellent results as a smelting furnace, for the reduction of metallic ores, was therefore fairly obvious. Experiments in this direction have shown, however, that the normal cupola, with its rising gas flow and combustion is not suitable for this purpose. The reason for this is that the high temperature required for the reduction of metallic ores, for instance at least 1450° C. in the case of iron ores, cannot be attained, by means of a rising combustion, in the proposed reduction zone of the furnace.

The object of the present invention is to eliminate these disadvantages of known shaft furnaces and to develop a shaft furnace for small plants which fulfills the desired requirements and allows the production of pig iron and its alloys from local ores and fuels, in particular from low quality and fine-grained ores by means of fuels of relatively poor quality. The present invention therefore concerns a method for working hot-blast shaft furnaces, as well as a shaft furnace which is suitable for carrying out this method.

The method according to the invention is characterized by the fact that the hot blast is blown in a downward direction into a shaft furnace containing a charge of material and the dimensions of which are smaller than those of the blast furnaces usually employed in the iron industry, and that the gases which develop are in this way led, at least for the greater part, in a downward direction and are withdrawn or drawn off from the lower portion of the furnace. This method may in particular be used for ore reduction purposes in shaft furnaces and, in general, for the recovery of iron values from iron-containing substances such as iron ore, iron alloy, steel scrap and the like.

The hot-blast furnace according to the invention is characterized by the fact that its dimensions are smaller than those of the blast furnaces of the iron industry, that means are provided to introduce the hot blast into the furnace in a downward direction, and that, in addition, it is provided in its lower portion with means of egress for the waste gases.

The exterior dimensions of this new shaft furnace are generally similar to those of a cupola; the shaft may for instance have a diameter of 65 cm. and a height of 4 m.

The accompanying drawing illustrates, by way of example, an embodiment of the hot-blast furnace according to the invention. This shaft furnace (see drawing) consists in the main of a shaft 1 enclosed by walls 2 of ceramic material. The shaft rests on a base 3 and the sole of the hearth 4 is preferably made of neutral material (carbon mass). The lining 2 of the shaft may be composed of basic or acid bricks. The walls surrounding the reduction zone 5 (high temperature zone) may advantageously be made of a neutral material. The shaft 1 is topped by a chimney 6 which is provided with an opening 7 for the charging material (for instance a mixture of ore and fuel) lying on the charging platform 8. The hot blast is blown through an annular pipe 9 and from there is introduced into the reduction zone 5 of the shaft in a downward direction through the nozzle 10. The gas outlet 11 in the lower portion of the shaft, situated in the immediate neighborhood of the molten metal 12, serves to draw off the major part of the waste gases, which are generally led to a recuperator, which is not shown, where they serve to heat the fresh blast. The drain for the molten metal is indicated by 13. The shaft furnace is further provided with a duct 14 and a circulating fan 15 by means of which a secondary gas flow is obtained, gases (hydrocarbons) being withdrawn at 16 from the upper portion of the shaft to be reintroduced into the combustion and reduction zone of the same by means of the annular pipe 17 and the nozzle 18.

The high temperature zone 5 of the furnace may advantageously be provided on the outside with cooling means, in order to increase the durability of the furnace lining. The lining of the furnace is preferably composed of basic refractory material, in order that iron having a low sulfur and phosphorus content may be produced when iron ores are reduced or pig iron is smelted.

The gas outlet 11 is advantageously connected to a recuperator, in which the heat contained in the waste gases is used to heat the hot blast entering through the nozzle 10.

I shall now describe, in the following, how the illustrated shaft furnace may be operated to reduce iron ores.

The shaft, which may for instance be 4 m. high, is filled from above through the opening 7 with large lumps of coke (heating fuel) to a level about 60 cm. above the discharge opening of the nozzle 10. The coarse coke thus fills the entire reduction zone, which has a height of from 1.2 to 1.5 m., of the shaft. On top of this, the remainder of the shaft is then entirely filled with a mixture of fine-grained low quality iron oxide ore having an iron content of about 30%, and of anthracite having an ash content of 33% and a heating value of from 4500 to 4800 calories. The granulation size of the ore and of the anthracite (reduction carbon) may be about 3–15 mm. The furnace is now heated up and the combustion started. At the same time a hot blast (air), coming from a recuperator and having a temperature between 450°–1000° C., usually between 700° and 1000° C., is introduced through the nozzle 10 in a downward direction into the reduction zone 5, the blast pressure being equal to 500–1200 mm. of water. During the combustion, the fine-grained ore-anthracite mixture trickles through the reduction zone filled with coarse coke and the ore is there reduced to metallic iron. The temperature in the reduction zone rises to 1800°–1900° C. The molten iron gathers in 12 and can be continuously drawn off through the drain 13. The combustion gases, which are mainly conducted downwardly, leave the shaft through the outlet 11, immediately over the molten iron, with a temperature of over 1600° C., and, in order to make use of the heat they contain, are led to a special recuperator which provides the hot blast necessary for operating the furnace.

In this fashion the exceptionally high temperature of over 1800° C. is obtained in the reduction zone of even such relatively small furnace units as this, thus enabling the reduction of iron ores to be effected with ease. The relatively small proportion of hot gases containing a large amount of hydrocarbons which escape upwardly through the charge may be drawn off at the point 16 by means of the circulation fan 15 and reintroduced into the reduction zone 5 by means of the duct 14, the annular pipe 17 and the nozzle 18.

The output of this shaft furnace amounts to about 700 kg. to 2 tons of iron per hour, depending on the quality of the ore.

It is the downward combustion, also called reverse firing, which enables such exceptionally high temperatures to be obtained in small furnace units, and thus makes the reduction of metallic ores possible. This reverse firing method has the further advantage that clogging of the furnace need not be feared when coal with a tendency to caking is being used.

The possibility of using fine-grained ores and fuels is very desirable. Because the combustion gases need not penetrate the zone occupied by the charge, the present shaft furnace allows fine-grained material to be used, which is particularly advantageous, as fine-grained materials, ores as well as fuels, are considered to be of poor quality and are proportionately low in cost.

A further advantage offered by this furnace is that it can not only be used as a reduction furnace but also as a smelting furnace, for example for foundry purposes. Tests have shown that not only normal cupola charges, but also, for instance, cast iron and steel turnings and similar fine scrap may be used without difficulty. It is therefore possible to obtain acceptable cast iron even with such turnings.

The described shaft furnace offers the further advantage that no coke need be used as reduction fuel, it being possible to work with normal coals, which further increases the economic efficiency of small installations.

In the case of the example given above to describe the use and working of the furnace, relatively poor ores and fuels were employed. In spite of this, the results achieved were positive, and it is therefore evident that considerably better results would be obtained with better ores and fuels.

The lower portion of the furnace can be arranged in such a manner that the molten metal, together with the slag and the waste gases, flows into a forehearth with a vaulted chamber, placed at the side of the furnace at a lower level, and in which the molten metal is collected whilst the hot waste gases are conducted upwardly through an opening in the vault to a recuperator. This results in the additional advantage that the hot waste gases remaining in contact with the liquid mass in the lower part of the furnace may be used to heat up the molten iron and slag further so as to complete the reduction of the iron oxide-containing slag, by means of the carbon monoxide and coal dust contained in the waste gas, thus causing the metal bath to react completely, for which temperatures from 1500° C. to 1600° C. are sufficient. It is of particular advantage to draw off the waste gases from particular region of the reduction zone in which there is the maximum $CO_2$ concentration and the gases are at their highest temperature. The remaining CO content of the reduction gases in the reduction zone may be burned to $CO_2$ by means of the hot blast acting as oxygen carrier.

It is also possible to arrange the lower portion of the reduction furnace, serving as a container for the molten metal, in such a manner that it forms an underhearth which can be rolled out sideways, and which is separated from the shaft proper by a part made of ceramic material and provided with a central opening.

I claim:

1. A hot blast shaft furnace for the recovery of iron values from iron-containing substances comprising a vertical shaft mounted on a hearth, said shaft having means for introducing a hot blast into its interior in a downward direction from a point substantially below its top and having duct means in the lower portion of the shaft just above the hearth for egress of a major part of the flue gases and duct means with circulating means to draw off the minor part of the gases in the upper portion of the shaft and reintroduce them into the lower portion of the shaft.

2. A furnace according to claim 1 in which the vertical shaft is lined with basic refractory material.

3. A furnace according to claim 1 in which the vertical shaft is provided with cooling means externally of the hot temperature zone.

References Cited in the file of this patent

UNITED STATES PATENTS

| | | |
|---|---|---|
| 470,481 | Gill | Mar. 8, 1892 |
| 482,213 | Wainwright | Sept. 6, 1892 |
| 1,334,310 | Mace | Mar. 23, 1920 |
| 2,201,738 | Neve | May 21, 1940 |
| 2,602,027 | Old | July 1, 1952 |
| 2,625,386 | Leone | Jan. 13, 1953 |
| 2,643,185 | Carter | June 23, 1953 |